Figure 1:
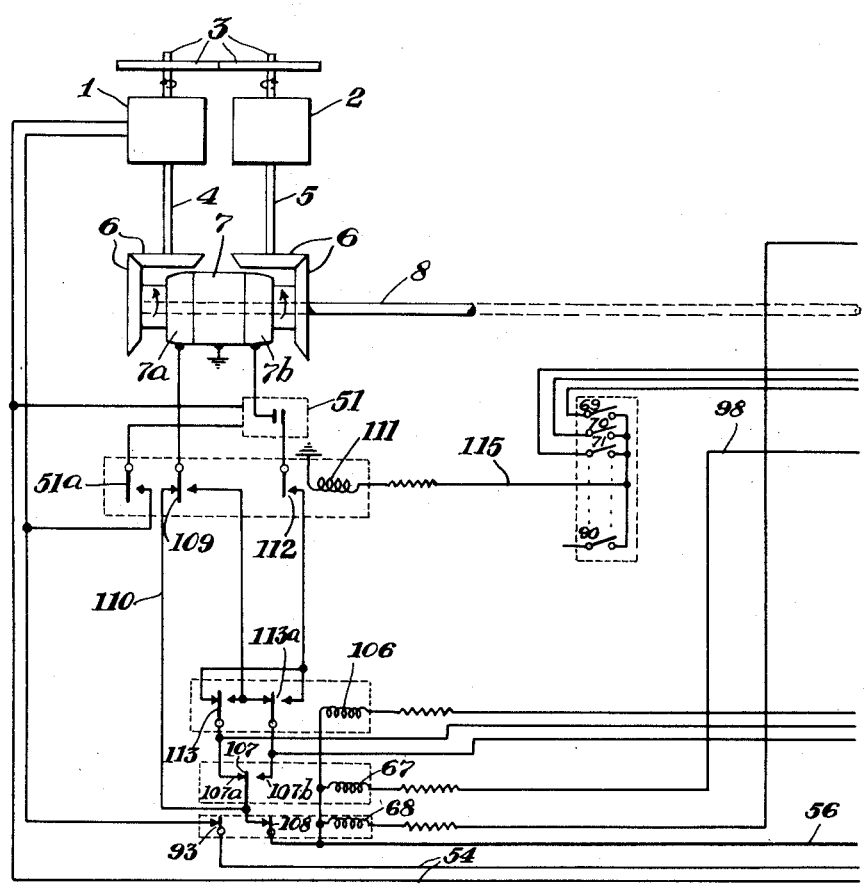

Oct. 31, 1950     H. MILLER     2,527,565
PRETIMED ELECTRICALLY OPERATED PROGRAM CONTROLLER

Filed Dec. 29, 1945     3 Sheets-Sheet 1

INVENTOR.
HARRY MILLER
BY
R. P. Morris
ATTORNEY

Oct. 31, 1950        H. MILLER        2,527,565

PRETIMED ELECTRICALLY OPERATED PROGRAM CONTROLLER

Filed Dec. 29, 1945        3 Sheets-Sheet 2

INVENTOR.
HARRY MILLER

BY

R P Morris
ATTORNEY

Oct. 31, 1950 H. MILLER 2,527,565
PRETIMED ELECTRICALLY OPERATED PROGRAM CONTROLLER
Filed Dec. 29, 1945 3 Sheets-Sheet 3
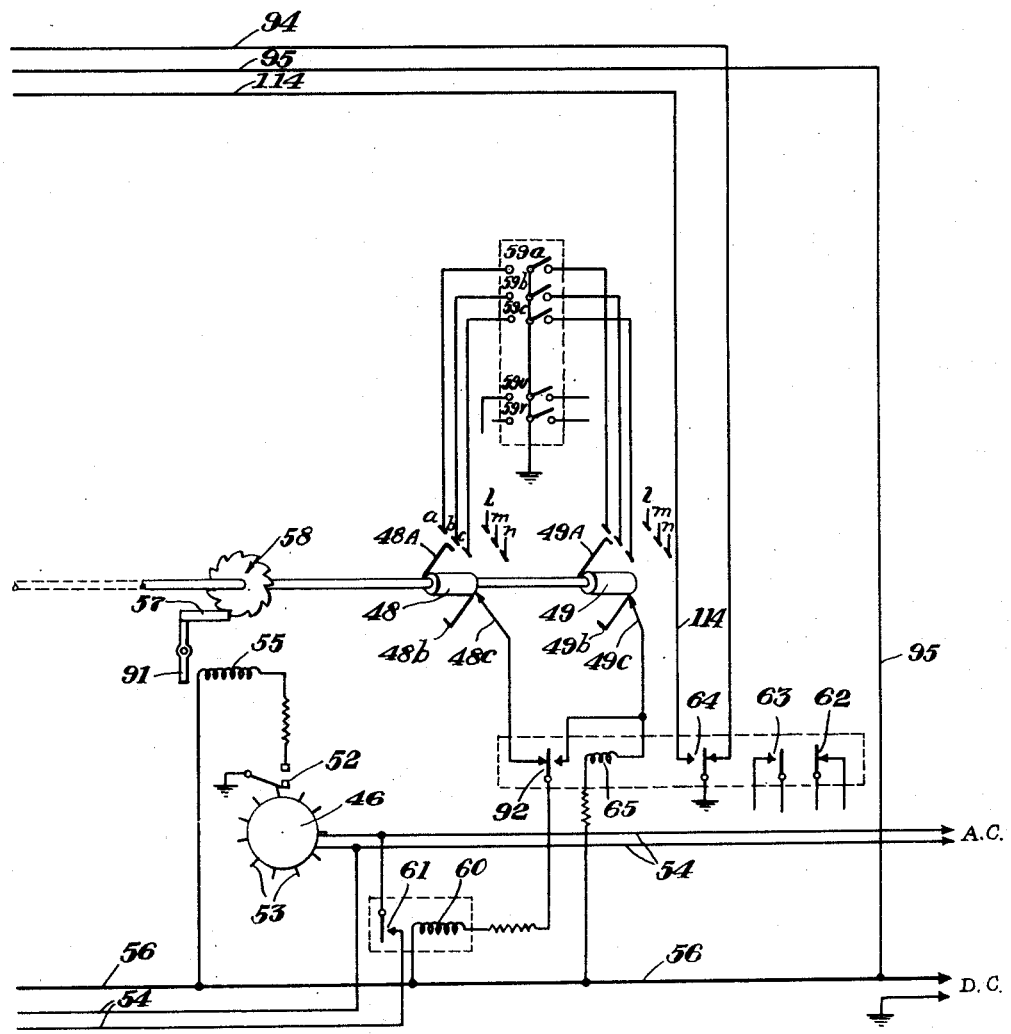
INVENTOR.
HARRY MILLER
BY
*R P Morris*
ATTORNEY Patented Oct. 31, 1950

2,527,565

UNITED STATES PATENT OFFICE 2,527,565

PRETIMED ELECTRICALLY OPERATED PROGRAM CONTROLLER

Harry Miller, New York, N. Y., assignor to Federal Telephone and Radio Corporation, New York, N. Y., a corporation of Delaware Application December 29, 1945, Serial No. 638,345

10 Claims. (Cl. 192—.02)

This invention relates to a program controller, and, more specifically, to an apparatus for producing automatic rotation of a shaft in accordance with a predetermined schedule.

Wherever a sequence or program of events is to be repeated often and each step in the program is to follow a definite time schedule, it may be desirable to employ a main control apparatus for producing such a program in terms of mechanical movements. This is an advantageous arrangement because these movements may subsequently put into operation a plurality of devices which will perform many separate and simultaneous actions. A typical illustration of the use of such an apparatus is in a testing or artificial aging system wherein conditions of temperature, pressure, humidity, flow, speed, voltage, or numerous other conditions are to be produced and maintained over definite periods of time. In an arrangement of this sort, each time a control shaft is rotated to a certain position, a switching array may be moved to switch on only those devices which create the desired conditions. By scheduling the rotation of this control shaft, then, it is possible to obtain varying conditions in any predetermined sequence and with a desired duration for a particular set of conditions.

Devices which will make possible the rotation of a shaft in a prescribed control schedule are commercially available, but these have such disadvantages as a too small number of steps in a schedule, bulky equipment, great expense, and difficulties in changing to different control schedules.

One object of the present invention, therefore, is to provide a simple and compact control device for automatically moving an element, e. g. rotating a shaft in accordance with some predetermined control program which involves a relatively large number of steps.

A second object is to provide a program device on which a schedule of operations may be prepared in a short time by unskilled personnel without the use of tools.

One particular function for which this invention has been found applicable was that of regulating the conditions in a stratosphere chamber in which were reproduced temperature, pressures, and humidities, corresponding to those encountered by military aircraft. Apparatus tested in the chamber was often subjected to and maintained at extremely hot and humid atmospheres and then similarly exposed to extremely cold and rarified atmospheres. Specifications for tests of many aircraft components demanded that they be subjected to a definite series of conditions over a period of time. Since these specifications differed in temperature range, length of time at each step of the cycle, rate of change of temperatures, and number of cycles per program for various components, the device herein described was conceived to make provisions for rapidly and simply producing the specified conditions.

Many occasions may arise either in experimental or routine test applications of this program control system wherein it is additionally required to have an adjustable rate of change between steps of the program, and commercially available apparatus which performs this function is very costly.

Another object of this invention is thus to provide a device for moving or rotating an element or shaft in steps according to a prescribed program wherein the speed of motion between steps may be varied.

A further object is to provide for use with a stratosphere chamber test unit, a device for producing rotation of one or more shafts which operate apparatus for regulating the temperature and humidity conditions in said unit for predetermined intervals.

According to a feature of the present invention as applied to a stratosphere chamber test unit, a predetermined program which is set up on a control panel determines the time and speed of rotation of one or more shafts to produce the various steps in the program or schedule. Separate slide wire potentiometers, one of which controls the dry bulb temperature of the chamber and the other of which controls the wet bulb temperature may be operated by such shafts. Settings of the potentiometers determine the point about which the temperature is accurately maintained. A duplex magnetic clutch makes it possible to drive these potentiometers in two directions, at particular times. This magnetic clutch is mechanically coupled to the output of a magnetic clutch which is driven both by a motor and the output of a reducing gear network connected to the motor. Depending upon which side of this clutch is energized the driving of the potentiometer is either fast or slow. The electrical circuits associated with this mechanical arrangement determine which sides of the clutches are to be energized for a particular step in the program and also the length of time for which they are energized.

Figure 2:
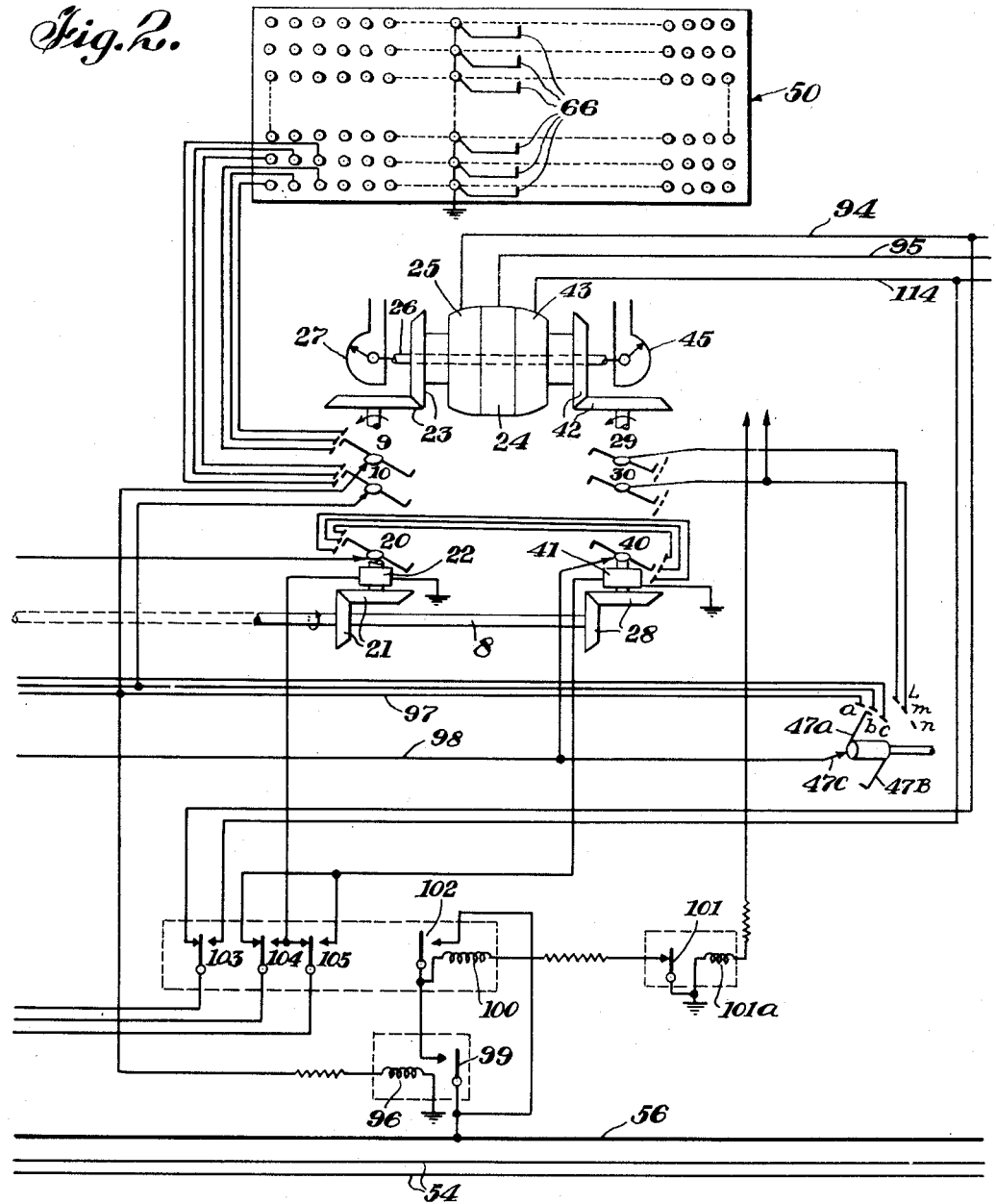

Other objects and features of this invention will become apparent and the foregoing will be better understood from the description of a typical embodiment as shown in the drawings, wherein:

Figs. 1, 2 and 3, when assembled side by side and from left to right in the order of their numerals, show a partially schematic and partially pictorial representation of one embodiment of a complete program controller arrangement which is typical of this invention.

Referring to the drawing, there is shown in Fig. 1, a source of mechanical driving power in the form of a one-revolution-per-minute alternating current motor 1, which is coupled to a 200-to-1 reducing gear or speed-varying system 2, by means of the coupling system 3. The combination of motor and reducing gear comprises a source of variable speed mechanical driving power since the speeds of the outputs therefrom are different. The output shafts 4 and 5 of motor 1 and gear 2 respectively are coupled by means of bevel gears 6 to a duplex magnetic clutch 7 which drives shaft or movable member 8. Both 4 and 5 cause shaft 8 to be rotated in the same direction and the clutch therefore serves as a means for controlling the speed of the shaft 8. The multi-contact selector switches (Fig. 2) 9 through 20 are coupled to shaft 8 by bevel gears 21 when the single magnetic clutch 22 is energized. Rotation of the switches 9 through 20 also results in the rotation of gears 23, driving the duplex magnetic clutch 24 which controls the direction in which the shaft 26 may be moved. While it is obvious that some sorts of schedules, the shaft-carried potentiometers 27 and 45 could be separately controlled by the duplex clutch 24, for the purpose of the present embodiment, the instrumentalities are mounted in a gang on a single shaft 26, movable in two directions of rotation, as shown. Shaft or movable member 8 here comprises a source of variable speed mechanical driving power, and clutch 7 acts as a speed control means for determining at what speed clutch 24 is to be driven. When, therefore, the side 25 of clutch 24 is energized, shaft 26 will rotate both slide-wire potentiometers 27 and 45 in one direction. In like fashion, bevel gears 28 will turn switches 29 through 40 when the single magnetic clutch 41 is energized. Also, gears 42 will then be rotated, and, if the side 43 of clutch 24 is energized, shaft 26 will turn the potentiometers 27 and 45 in the opposite direction. Settings of the potentiometers 27 and 45, which may be utilized to control the dry and wet bulb temperatures of a stratosphere chamber, as previously mentioned, may thus be increased or decreased at a slow or rapid rate, depending upon which sides of the two duplex clutches 7 and 24 are energized. Gears 21, 23, 28 and 42, and clutches 41 and 22, their respective shafts, and clutch 24, comprise a two-direction shaft or member-moving means for transferring mechanical power from shaft 8 to shaft 26. The energizable sides 25 and 43 of clutch 24 permit control of the direction in which the shaft 26 may be turned.

The mechanical details of the controller have been disclosed up to this point, but without automatic energizing and switching circuits it is not possible to follow a schedule in the manner prescribed heretofore. In the discussion following, details of the means coupled to the source of power 8 and the control means 7 for starting at each step of the schedule and variably maintaining the operation of the source and clutch are disclosed. The arrangement which performs these functions includes the program clock 46, (Fig. 3), the large selector switches 9 through 20 and 29 through 40, the control socket and grounded plug network 50 (Fig. 2), one or more timers such as 51 (Fig. 1), a plurality of relays, and the six-level multi-contact switch array composed of switches 47, 48 and 49 (Figs. 2 and 3).

Each step in the program is initiated when switch 52 is closed for a short time by a projection 53, on the program clock 46 which may be operated from A. C. mains 54. The momentary closing of switch 52 causes coil 55 to be pulse energized by the D. C. potential existing between line 56 and ground. This in turn causes arm 57 to move and allows ratchet wheel 58 to turn over one step, turning with it switches 47, 48 and 49 so that the arms of these switches wipe a new set of contacts. Timing of the switching is accomplished by spacing the projections 53 around the periphery of the program clock 46, such projections comprising means for setting the clock for closing the switch 52 at predetermined times.

The six-level multi-contact switch composed of sections 47, 48 and 49 includes three groups of contacts 47a through 47v, 48a through 48v, and 49a through 49v. These three groups of twenty-two contacts are arranged in three pairs of levels of contacts such as 47a through 47k and 47l through 47v. Two electrically connected wipers 47A and 47B, 48A and 48B and 49A and 49B, are provided for each group and each of the wipers in a pair is displaced 180° from the other. During 180° of rotation of sections 47, 48 and 49, only one wiper of each pair makes connection with one level of contacts in each section, and during the remaining 180° of a complete revolution the other wiper of each pair contacts the second level in each section.

Two of the switches of the group, 48 and 49, have their contacts connected to opposite sides of a set of twenty-two increase-decrease, single pole, double throw toggle switches 59a through 59v. These toggle switches may ground contacts from either group. When the section 48 contacts are thus grounded and none of section 49 grounded, relay 60 (Fig. 3) is energized and motor 1 is fed from mains 54 through relay contact 61, hence means for starting the motor are realized. Also, the heating switch 62 is closed, the refrigeration switch 63 is open and the "increase" side 25 of the duplex magnetic clutch 24 is energized through switch 64. Conversely when the toggle switches ground the contacts of switch 49, relay 65 (Fig. 3), is energized to open the heating switch 62, close the refrigerating switch 63, and move the switch 64 to a position wherein the "decrease" side 43 of clutch 24 is energized.

The remaining switch 47 of the group has its contacts 47a through 47k connected to selector switches 9 through 19 and contacts 47l through 47v connected to selector switches 29 through 39. The one hundred and one contacts of each of these switches are connected with individual sockets arranged in rows, horizontally as shown, on the panel 50 (Fig. 2). Grounded plugs 66 which may fit into any of the one hundred and one sockets of any particular value are provided for each row.

As the pulses from program clock 46 move the switches 47, 48 and 49 one contact per pulse, one of the large selectors, either 9 through 20 or 29 through 40, is disturbed and caused to turn until that contact in an appropriate row has been wiped which has previously been grounded through a plug 66. When this has been done, a relay 67 operates to enable the other selector to be rotated to the same corresponding point. This is made possible by interconnecting the contacts of switches 20 and 40 point to point. When both selectors contact corresponding points, a relay 68 operates to stop all motion until the selector circuits are disturbed by movement of the switch 47. The action of the switches 9 through 20 or 29 through 40, comprising a time-delay apparatus, is that of a time delay system controlling the interval during which shaft 26 is turned.

The speed of the selector switches 9 through 40 for the steps during which they control the slide wire potentiometer settings are determined by the positions of the series of twenty-two single pole, single throw, fast-slow toggle switches 69 through 90. When certain of these toggle switches are closed, the motor-driven "fast" side, 7a, of the clutch 7 may be energized through them to rotate the selector switches rapidly. If the switches are open, the gear-driven "slow" side, 7b, of the clutch may be energized and the selector switches are driven slowly. If an adjustable industrial process timer 51, is also incorporated in the circuit leading to the gear-driven "slow" side of clutch 7 the effective speed of rotation of the selector switches and clutch 24 may be varied. This change in effective speed is produced by de-energizing clutch 7 for a percentage of the time during which energizing may take place. A speed control means is thereby obtained through the use of timer 51.

To establish a program, it is necessary to adjust the projection 53 on program clock 46 to transmit a direct current pulse when a change is to be produced in the schedule, adjust the industrial timer 51 to give the correct rate of change between steps, throw the slow-fast switches 69 through 90 to the desired position for each step in the program, throw the increase-decrease toggle switches 59a through 59v to the desired position for each step of the program, ground one socket contact in each row of panel 50 with a jumper 66 so that the numerical difference between the vertical columns of succeeding row contacts represent the change required between steps in percent of the total controller range, and manually adjust the slidewire potentiometers to their first settings. When lines 54 are connected to a suitable A. C. supply and an appropriate D. C. potential exists between line 56 and ground, the apparatus is then ready to operate in accordance with the program which is prepared.

If a projection 53 on the program clock 46 momentarily closes contact 52, whereby a pulse of direct current will flow over a path from ground through coil 55 (Fig. 3), connected to line 56 and grounded source. The lever 57 will be moved because of the attraction between section 91 and coil 55. Since the attraction exists for a very short time, ratchet wheel 58 turns only a short distance before the next tooth of the wheel engages lever 57. The rotation of wheel 58 also causes the switches 47, 48 and 49 to revolve through the same angle and to wipe another set of contacts.

Let it be assumed that wiper arms 47A, 48A and 49A have just been connected in this fashion with contacts 47a, 48a and 49a respectively. If toggle switch 59a is closed on the "increase" side, that is, if contact 48a is connected to ground through this switch, relay switch 92, (Fig. 3), will pass current from line 56 through relay coil 60 to ground. Switch 61 will be closed when coil 60 is thus energized and motor 1 will operate since switch 93 (Fig. 1), is now closed, as will become apparent from a further discussion. Heating switch 62 will remain closed, relay coil 65 not being energized, and refrigeration switch 63 will remain open, therefore only the heating apparatus will be put into operation. In addition, the "increase" side, 25, of clutch 24 will be energized through line 94, relay switch 64 and line 95. The slidewire potentiometer 27 will then be rotatable when gears 23 revolve. The switch 64 operated by relay coil 65 acts as a means for energizing the clutch 24 to make possible its rotation in the desired direction.

These gears 23 will turn when the magnetic clutch 22 is energized, since shaft 8 will be shown to be turning gears 21 which drive switches 9 through 20 and gears 23. That clutch 22 is energized may be proved by tracing through the parts of the circuit connected thereto (Fig. 2). Relay coil 96 grounded on one side and connected to the ungrounded D. C. line 56 through line 97 through 47a, 47A, 47C, line 98, and relay coil 67. When relay coil 96 is thus energized, switch 99 is closed so that coil 100 may be energized through switches 99 and 101 (Fig. 2). The energizing of coil 100 closes switch 102 which insures that this coil will be energized when switch 101 is closed. As long as wiper arm 47A wipes contacts 47a through 47k, the switch 101 will remain in the closed position.

When coil 100 is energized by these actions double throw relay switches 103, 104 and 105 will be moved to the contact position wherein relay coil 106 (Fig. 1), is connected through switch 103 to the "decrease" side 43 of clutch 24, but is not energized because switch 64 grounds the "increase" side 25; switch 104 connects the single magnetic clutch 22 to the D. C. line 56 through closed switch 108 and through armature 107 contacting 107a, hence clutch 22 becomes energized; and switch 105 connects single clutch 41 to 107b which is not now connected to line 56, hence clutch 41 is open-circuited. Since clutch 22 is energized shaft 8 can rotate gears 21, switches 20, gears 23, shaft 26, thus producing the "decrease" effect. If switch 69 (Fig. 1) is open, that is, set for "fast operation of motor 1, the double magnetic clutch 7 will be energized through switch 109, of relay coil 111 (Fig. 1), line 110 and switch 108 connected to D. C. line 56. Therefore, shaft 4 will cause shaft 8 to revolve at a rapid speed. It is important to note that if switch 69 had been set for "slow" turning of shaft 8, that is, if 69 were closed, coil 111 would have been energized, switch 112 of relay coil 111 would have been closed, switch 113 would connect the clutch between switch 112 and a D. C. voltage point 107a, timer 51 would connect switch 112 with the "slow" side of clutch 7 so that shaft 5 would cause shaft 8 to revolve slowly, and timer 51 would be connected to A. C. mains 54 through switch 51a of relay coil 111.

Assuming that shaft 8 is turned fast, slidewire potentiometers will also be rotated and likewise switches 9 through 20. Contact 47a is connected to rotor 9a of switch 9 and when a contact grounded by a jumper 66 on panel 50 is wiped by 9a, marginal relay 67 will pass sufficient current to move relay armature 107 to position 107b. For this switch position, clutch 41 is energized through switch 105 of relay coil 100 so that switches 29 through 40 turn, and clutch 22 is unenergized so that switch 9 remains on the grounded contact. When switch 40, whose contacts are in parallel with the contacts of switch 20, wipe the contact corresponding to that on which switch 20 has stopped, relay coil 68 (Fig. 1), becomes energized due to the connection between D. C. line 56 and grounded contact 47a, and switches 93 and 108 are opened, stopping the motor 1 and all further action until clock 46 again closes switch 52.

Thus the rotation of shaft 26 has made it possible to cause an increase in temperature, beginning at a definite time, increasing at a fast rate, increasing for a particular length of time, and remaining at the final temperature for a desired length of time. Following this it is possible to produce another increase or a decrease depending on the setting of the clock, switches and panel board plugs.

For example, assume that it is required to produce a decrease in temperature beginning with the 12th step in the program of this controller. A projection 53 on clock 46 closes switch 52 and coil 55 becomes energized momentarily. Ratchet wheel 58 turns one step when lever 57 attached to arm 91 is attracted to coil 55. Wiper arm 49B is thus moved to contact 49l. Contact 49 is grounded by double throw toggle switch 59l which has been set in this position for a "decrease" step in the program. Coil 65 (Fig. 3) is thus connected between the D. C. voltage line 56 and ground, and, when energized by this action, attracts the armature switches 62, 63, 64, and 92. Switch 63 then causes a refrigerating system to operate, switch 62 prevents a heating system from operating coil 60 (Fig. 3), is grounded through switch 49, and, since 60 becomes energized, switch 61 is closed. Switch 64 is in a position wherein the lead 114 from the "decrease" side 43 of duplex clutch 24 is grounded and gears 42 are permitted to turn shaft 44 and slidewire potentiometer 45 because side 43 is energized between high voltage D. C. lead 95 and grounded lead 114.

Switch wiper arm 47B also connects with contact 47l which is connected to switch 29. A slow rate of change being desired, toggle switch 79 is closed to ground line 115. This causes line 98 to be grounded through clutch 47 and relay coil 111, therefore marginal relay coil 67 is not fully energized and relay armature 107 contacts 107a. When arm 47b connects with 47l, coil 101a energizes through coil 67, line 98 and switch 47. This causes switch 101 to open, coil 100 becomes deenergized and switches 102, 103, 104 and 105 assume the positions shown in the figure.

With switch 108 closed, switch 104 connects clutch 41 with a D. C. voltage supply and 41 becomes energized so that it causes switches 29 through 40 and gears 42 to rotate when gears 28 are revolved. Shaft 8 revolves gears 28 slowly since the "slow" side, 7b, of clutch 7 is energized through correctly closed switches 112, 113, 107 and 107a, and 108. Switch 112 is closed because coil 111 is energized as previously explained, coil 106 is unenergized and 113 thus connects 112 with 107a, and 107 is closed with 107a because marginal relay 67 is not fully energized. The timer 51 is located between switch 112 and clutch 7 and allows the clutch to be energized for only a percentage of the time it would ordinarily be energized in the absence of the timer, hence controlling the effective speed of the shaft 8 driven by gears 6 and shaft 5.

When shaft 8 has rotated gears 28, switches 29 through 40, gears 42, and shaft 26 sufficiently to cause a contact wiped by switch 29 to be grounded by a plug 66 on control panel 50, marginal relay 67 becomes energized sufficiently to close 107 with 107b. Single clutch 22 then becomes energized through switch 105 and switch 20 is revolved by shaft 8 turning gears 21. The revolving of switch 20 stops when that contact is wiped which is connected to the contact on which switch 40 has stopped. This stopping occurs because coil 68 becomes energized and opens switch 108 to cut off motor 1 from its power source. Until clock 46 again closes switch 52 no movement of the controller mechanism can take place.

In the sequence of actions just described, the shaft 26 and slidewire potentiometers were turned to decrease the temperature in the chamber to a certain value at a definite rate and for a particular length of time. Both of the detailed descriptions of the operation of the program controller showed that a shaft could be revolved in one step of a program at a desired effective rate to a definite position for a specified time interval, and again revolved another step in accordance with the same or another schedule. No new apparatus is required for a change of program; this is accomplished by adjusting the spacing of plugs 66 on the control board 50, manipulating fast-slow toggle switches 69 through 90 and the increase-decrease toggle switches 59a through 59v, initially setting the position of slidewire potentiometers 27 and 45, and spacing the projections 53 on program clock 46. If timers such as 51 are included in the system, these must also be adjusted for a desired rate of change in each step of the program.

The rate of change between successive steps of a given program may be automatically altered if additional timers are incorporated in the arrangement. Also within my program cycle, a variable rate of change may be approximated by a series of steps.

It should be apparent that any number of steps in a control schedule may be obtained if proper switches are employed. This would call for substitution of other switches with greater numbers of contacts and the addition of other rows of socket contacts and grounded plugs on the control panel 50.

The speed of the motor employed will depend upon the requirements which the controller must meet, and many gear combinations may be used to produce particular speeds. A control panel other than the pin and socket types shown at 50 may easily be devised also. It is obvious, then, that many changes may be made by those skilled in the art without causing the resulting system to differ in principle from this invention.

The present invention has been illustrated and described with respect to a particular embodiment which is considered exemplary, but not limitative.

I claim:

1. An automatic control device for moving a member two directions in accordance with a predetermined schedule of movement and repeating said schedule, comprising a member movable in two directions, a source of variable speed mechanical driving power, two-direction member-moving means coupled to said source and transferring mechanical power therefrom to said member, control means coupled to said source for determining at what speed said member-moving means is to be driven, means included in said member-moving means for controlling the direction in which said member may be moved, a timer coupled to said source and each of said means for starting the operation of said source and each of said means at every step of said schedule, and a time-delay arrangement connected to said timer and said source of mechanical power for stopping the operation of said source of mechanical driving power at a predetermined time following the starting of said operation.

2. An automatic program control device for rotating a shaft in two directions in accordance with a predetermined schedule of rotation and repeating said schedule, comprising a shaft rotatable in two directions, a source of mechanical power which may operate at different speeds, two-directional shaft-driving means coupled to said source and transferring mechanical power therefrom to said shaft, control means coupled to said source for determining at which of said speeds said shaft-driving means may be driven, means included in said shaft-driving means for controlling the direction in which said shaft may be turned, a timer coupled to said source and each of the aforementioned means for starting the operation of said source and each of said means at every step of said schedule, a time-delay arrangement connected to said timer and said source of mechanical power for stopping the operation of said source of mechanical power at a predetermined time following the starting of said operation, and at least one speed varying system coupled to said source of power and said control means for producing a desired speed of operation of said source of mechanical power.

3. A device for automatically revolving a rotatable member in a plurality of steps according to a predetermined schedule of time and directions of rotation, comprising a motor, a speed-reducing system coupled to said motor, a first magnetic clutch having dual sections, one of said sections being rotatable by said motor and the other of said sections being rotatable by said speed-reducing system respectively, a rotatable member, a second dual-section magnetic clutch which is coupled to said rotatable member and which may rotate said member in either of two directions depending upon which section is energized, connecting means between the two magnetic clutches arranged such that said second clutch may be driven in either of said two directions by said first clutch, a timer, a motor starting means coupled to said motor and actuated by said timer, an energizing means coupled to said first magnetic clutch and actuated by said timer for selectively energizing one of said dual sections of said first clutch to permit either rapid or slow rotation of said connecting means, a time-delay stopping system actuated by said timer and coupled to said motor for stopping rotation thereof after predetermined intervals of operation, at least one adjustable speed control means coupled to said energizing means and to the section of said first clutch which is at a particular time rotatable by said speed-reducing system, and a second energizing means coupled to said timer and to said second magnetic clutch for selectively energizing said second clutch to make possible its rotation in the desired direction.

4. A device according to claim 3 wherein said connecting means between the two magnetic clutches comprises a shaft rotatable by said first clutch, two additional shafts mechanically coupled to said second clutch for driving said second clutch in opposite directions, two single magnetic clutches selectively coupling said two shafts to said shaft rotatable by said first clutch, and electrical switching means for energizing one of said single magnetic clutches when one of said two shafts is to be rotated.

5. A device according to claim 3 wherein said timer comprises a clock, a switch momentarily actuated by said clock at predetermined times, means for setting said clock for closing said switch at said times, a rotatable element, and a means for rotating said element, a fixed amount in response to the closing of said switch.

6. A device according to claim 3 wherein said motor starting means coupled to said motor and actuated by said timer comprises an electrical switch which is energized to permit said motor to operate upon being actuated by said timer.

7. A device according to claim 3 wherein said energizing means coupled to said first magnetic clutch and actuated by said timer for selectively energizing one of said dual sections of said first clutch comprises a source of direct current voltage, a plurality of single-pole single-throw switches, a relay, a relay coil included in said relay, a multi-contact switch having at least one contact for each step in a desired schedule of steps and rotatable by said timer, each contact of said multiple switch being connectable to ground through one of said single throw switches and the relay coil, and the wiper arm of said switch being connected to a direct current voltage line so that said relay becomes energized when said wiper arm wipes a contact grounded through one of said single throw switches and said relay coil, and means controlled by said relay for energizing either the rapid or slow section of said first clutch at a particular time.

8. A device according to claim 3 wherein said time-delay stopping system comprises a means for stopping operation of said motor, a relay for actuating said means for stopping operation of said motor, a plurality of multiple-contact switches rotatable by said first clutch, grounded connections to one contact on each multiple-contact switch, a direct current voltage source, means for successively connecting said relay to the wiper arm of each of said multiple-contact switches as said switches rotate, means connecting said relay across said direct current source through said multiple contact switches so that when each switch wipes a grounded contact the relay will actuate said means for stopping operation of said motor.

9. A device according to claim 3 wherein said speed control means comprises a timing apparatus which permits said energizing means to energize said first clutch only a desired percentage of the possible energizing time.

10. A device according to claim 3 wherein said second energizing means comprises a source of voltage, a relay which may be energized by said source, means operated by said timer for energizing said relay at certain steps of said schedule, and means for connecting said source of voltage to energize one section of said second clutch when said relay is energized and to energize the other section when said relay is not energized.

HARRY MILLER.

REFERENCES CITED

The following references are of record in the file of this patent:

UNITED STATES PATENTS

| Number | Name | Date |
|---|---|---|
| 1,766,808 | Altmayer | June 24, 1930 |
| 1,932,040 | Hunter | Oct. 24, 1933 |
| 2,281,244 | Milar | Apr. 28, 1942 |
| 2,300,421 | Henderson | Nov. 3, 1942 |
| 2,344,253 | Kirby | Mar. 14, 1944 |
| 2,347,190 | Geldhof | Apr. 25, 1944 |
| 2,367,363 | Mott | Jan. 16, 1945 |
| 2,376,552 | Nelson | May 22, 1945 |